No. 798,071. PATENTED AUG. 29, 1905.
J. H. PITKIN.
BLOCK INSERTER FOR BALING PRESSES.
APPLICATION FILED MAY 4, 1905.
2 SHEETS—SHEET 2.

Witnesses
J. M. Daggett
T. H. Mynds

Inventor
Julian H. Pitkin.
By J. C. Varnes
Atty.

UNITED STATES PATENT OFFICE.

JULIAN H. PITKIN, OF CHICAGO, ILLINOIS, ASSIGNOR TO INTERNATIONAL HARVESTER COMPANY, A CORPORATION OF NEW JERSEY.

BLOCK-INSERTER FOR BALING-PRESSES.

No. 798,071.  Specification of Letters Patent.  Patented Aug. 29, 1905.

Application filed May 4, 1905. Serial No. 258,773.

To all whom it may concern:

Be it known that I, JULIAN H. PITKIN, a citizen of the United States, residing at Chicago, in the county of Cook and State of Illinois, have invented a new and useful Improvement in Block-Inserters for Baling-Presses, of which the following is a complete specification.

This invention relates to hay-balers of the type which is provided with a self-feeding mechanism and a block-inserting device; and it consists in certain novel means, automatically actuated, for controlling the movement of the said feeding mechanism and the block-inserter, the object being to arrange single means for actuating both these parts, thereby reducing the number of operative elements and timing the relative movements thereof perfectly in relation to each other.

Figure 1:
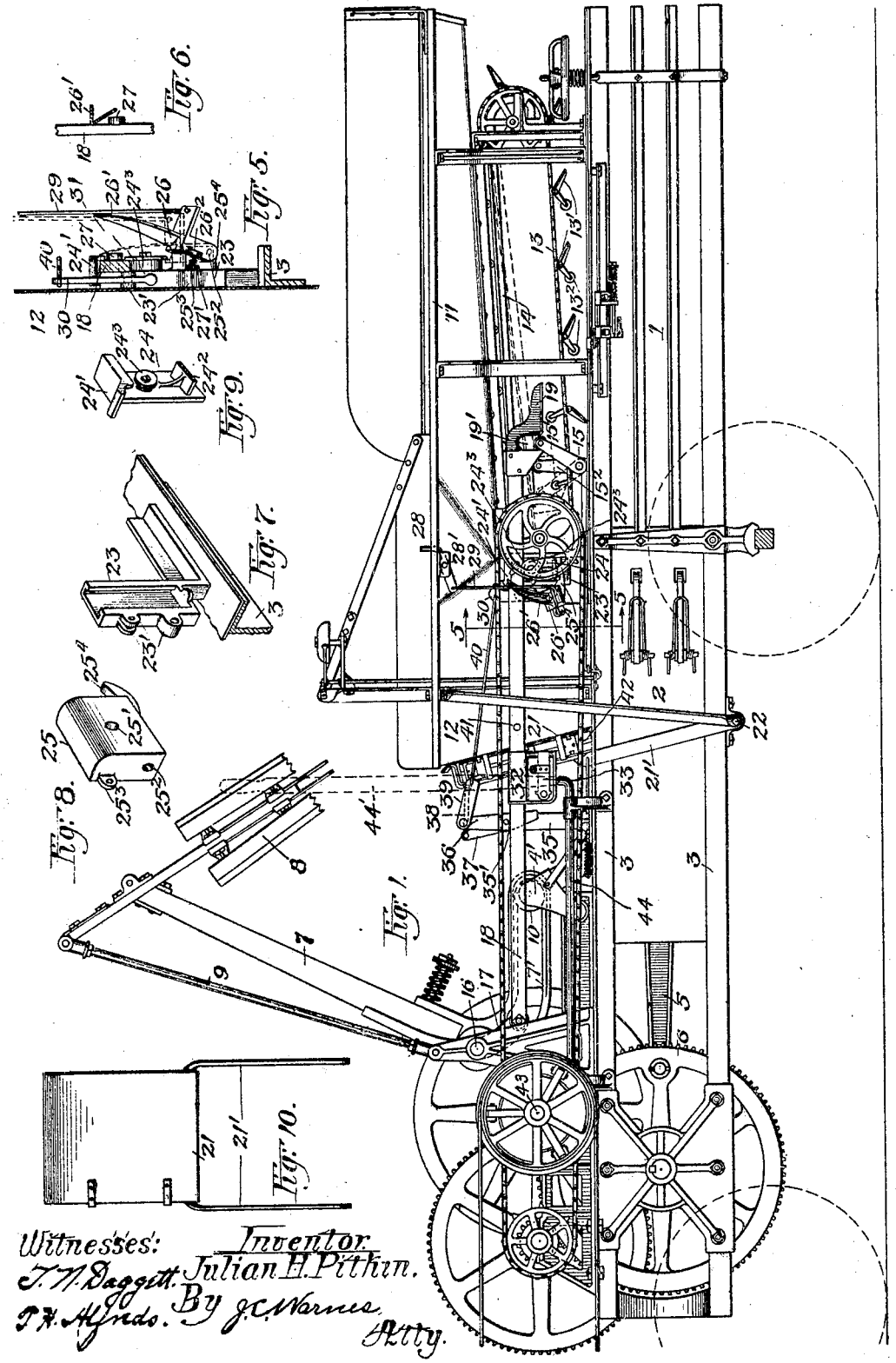
Figure 2:
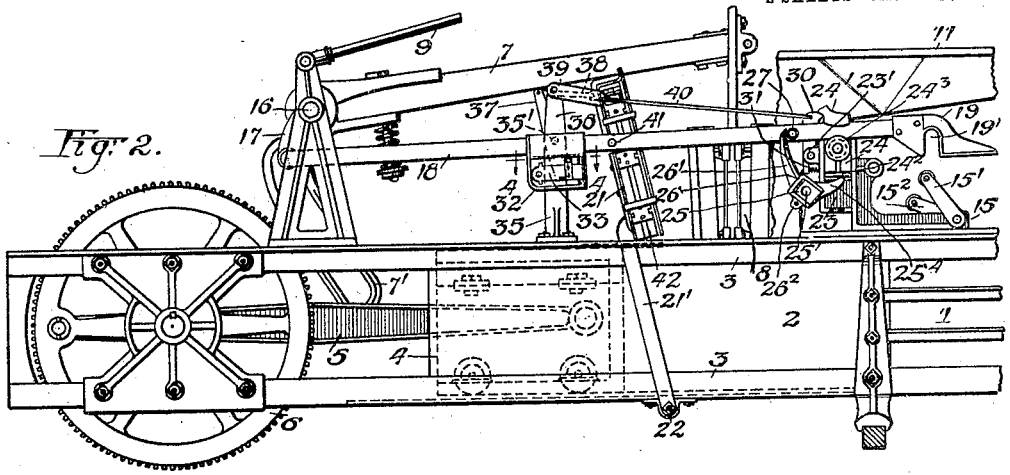
Figure 4:
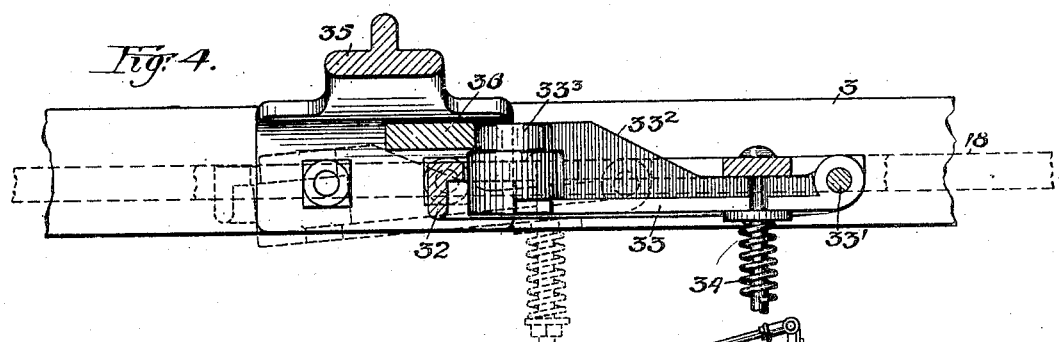
Figure 3:
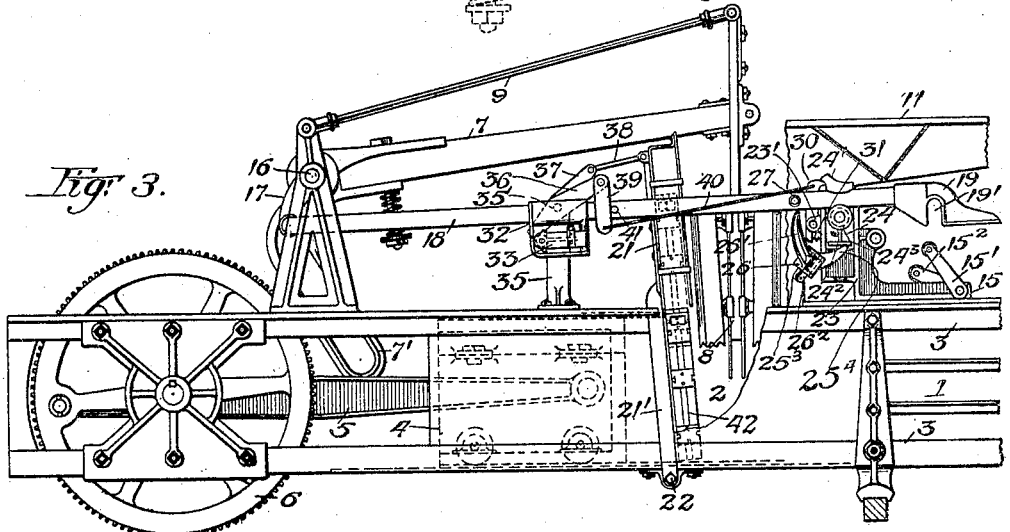

Referring to the accompanying drawings, Figure 1 represents a side elevation of a baler in which is embodied my invention. Fig. 2 is a side elevation of the forward end of the machine, the various parts being shown in the positions they occupy at the beginning of the ascent of the feeder-arm and preparatory to the advance of the block-inserting frame. For clearness the plunger connection of the feeder-arm is omitted. Fig. 3 shows a corresponding view, but with the parts in the position they occupy when the feeding-arm is descending and near the end of the stroke or practically at the same position it is shown to occupy in Fig. 2. Fig. 4 represents an enlarged plan section taken as indicated by the line 4 4 in Fig. 2. Fig. 5 is a transverse section taken, as indicated, by the line 5 5 in Fig. 1, through the reciprocating bar, which controls the block-inserter and feeding mechanism, the view being designed to show the device for automatically raising the said bar into an engaging relation with the block-inserter. Fig. 6 is a transverse section of the roller-engaging arm. Fig. 7 is a perspective detail of the bracket in which slides the vertically-movable roller-carrying frame for supporting the rear end of the reciprocating bar. Fig. 8 is a perspective of the swivel-block which pivots thereon. Fig. 9 represents a view in perspective of the vertically-movable sliding frame, and Fig. 10 shows in elevation that side of the block-carrying frame which faces the hopper.

In the drawings, 1 designates the baling chamber; 2, the compression-chamber; 3, the angle-bars, which constitute the chief members of the frame of the press; 4, the plunger, and 5 the pitman for driving same, which connects with the large gear 6. The oscillating feed-lever 7 is provided with the feeder-head 8, the position of which is controlled by the rod 9. The operation of the feed-lever is effected by means of the downwardly-projecting slotted arm 7', which is made to engage a roller 10 on the upwardly-projecting arm 4' of the plunger 4. Mounted beneath the feed-table 11 and extending rearward from the hopper 12 is the feed-chain 13, which is provided with the hay-engaging fingers 13'. The fingers 13' have each a track-engaging roller $13^2$. Said fingers are rendered operative or inoperative by the rising or depressing, respectively, of the cam-track 14, this cam-track being operated by means of the bell-crank 15.

For a more specific description of the foregoing parts reference may be had to two former applications filed by me—viz., Serial Nos. 253,015 and 253,016—both relating to the type of balers herein set forth and filed by me March 31, 1905.

On the same shaft 16 which supports the feed-arm 7 is rigidly secured the short arm 17, to which is pivotally connected the forward end of the longitudinally-disposed reciprocating bar 18. On the rear end of the bar 18 is secured the head-piece 19, which is provided with the vertically-extending slot 19', open below, as shown, and arranged to engage the outer arm 15' of the bell-crank 15. The inner arm $15^2$ of the bell-crank operates to raise and lower the forward end of the cam-track 14 and in this manner render operative or inoperative the fingers 13' of the feeding-chain 13, as fully described in the first mentioned of the above applications. When the reciprocating bar 18 is in its lower position, as shown in Fig. 1, the slot 19' in the head 19 engages the said arm 15', thus causing the bell-crank to vibrate back and forth, which will in turn cause the forward end of the cam-track 14 to rise and fall; but when the bar 18 has been raised to its upper position, as shown in Figs. 2 and 3, it no longer engages the said bell-crank, but is in position to actuate the block-inserting mechanism, which with the automatic mechanism for raising and depressing the reciprocating bar will now be described.

The block-carrying frame 21, situated immediately in front of the hopper 12, is provided with the two downwardly-projecting arms 21′, which straddle the frame of the press and have a pivotal bearing on the under side of said frame at the point 22. Having the comparatively long supporting-arms 21′, the block-carrying frame is movable longitudinally, and for the short distance it moves in substantially a horizontal direction. The block-carrying frame, as will be seen from the detail view shown in Fig. 10, is open on the side opposite to the reciprocating bar 18 and is also open on the bottom, the division-block being inserted on the open side and allowed to rest on the upper surface of the frame of the press just forward of the compression-chamber. It is evident that as soon as the block-carrying frame is moved rearwardly until it occupies a position above the compression-chamber it will drop therein.

To automatically raise the bar 18 from its lower to its upper position, the following-described means are employed: A bracket (see Fig. 7) 23 is secured to the top of the press-frame in a position near the rear end of the reciprocating bar 18, and in this bracket fits the vertically-sliding frame 24, a tongue-and-groove connection being provided between these two members. On the upper end of the sliding frame 24 is the cap-like termination 24′, flanged at the side, as shown. On the side of the frame is also journaled the roller $24^3$, on top of which and beneath the flanged portion of the cap 24′ is supported the rear end of the reciprocating bar 18. $24^2$ is a laterally-extending foot portion the function of which will presently be explained. The bracket 23 has formed on its forward side two apertured lugs 23′, in the lower one of which is pivotally mounted the swivel-block 25, a detail of which appears in Fig. 8. A pin received by the aperture 25′ forms the pivotal axis of the said block, and in a transversely-extending aperture $25^2$ in the same block is received a pin which forms the axis of the forked arm 26. The rearwardly-projecting arm $25^4$ of the swivel-block 25 is arranged to rest against the under side of the laterally-projecting foot portion $24^2$ of the sliding frame 24, while the upwardly-extending portion 26′ of the forked arm 26, when swung inwardly against the bar 18, will be impinged by the roller 27 thereon. A coil-spring 27′, interposed between the lug $26^2$ on the forked arm 26 and the lug $25^3$ on the swivel-block 25, exerts a pressure tending to hold the said upwardly-extending portion 26′ of the forked arm 26 normally in a laterally-deflected position and in a non-engaging position with respect to the roller 27.

In order that the roller 27 may not act upon the upwardly-extending portion 26′ of the forked arm 26 when the bar 18 is moving rearwardly, the said upwardly-extending portion 26′, which engages same, is beveled on its forward side, as shown in Fig. 6, thus permitting engagement in the forward movement only of the reciprocating bar. A foot-lever 28, pivoting at 28′, connects with the forked arm 26 by means of the link 29, by which means the upwardly-extending portion 26′ is moved inwardly against the said bar 18 and into engagement with the roller 27. A latch 30 which has a pivotal bearing in the upper lug 23′ and extends upwardly is arranged to engage beneath the cap portion 24′ of the sliding frame 24 when the latter is raised to its upper position, and so hold it until released. A spring 31 operates to hold this latch normally in an engaging position, from which position it is withdrawn by means hereinafter described.

Secured to the reciprocating bar 18 at a point adjacent to the block-carrying frame 21 is a depending open frame 32, in which is pivotally secured the longitudinally-extending laterally-yielding spring-held pawl 33, the spring 34 being arranged to hold the said pawl in the full-line position, as shown in Fig. 4. The bar 18 is represented in this view by dotted lines, and the depending frame 32 is shown in section. The pawl 33 pivots at 33′ and is provided with an inwardly-projecting beveled web $33^2$ and the round shoulder $33^3$.

On top of the baler-frame and in front of the block-carrying frame is the standard 35, in which is journaled the rock-shaft 35′, to which is secured the arm 36 on the left-hand side of said standard and the arm 37 on the right side thereof. The arm 37 is connected to the block-carrying frame 21 by means of the link 38, while the lower end of the arm 36 is arranged to be engaged and actuated by the pawl 33. The upper end of the arm 36 connects with the latch 30 by means of the short and long links 39 and 40, respectively. The relative length of these links 39 and 40 is such that as the lever 36 rocks from the position shown in Fig. 2 to the position shown in Fig. 3 the short link 39 will drop in front of the pin 41 in the bar 18 as it moves forwardly, and immediately upon such engagement the latch 30 will be made to release the sliding frame 24 and permit it with the bar 18 to drop to its lower position.

The driving mechanism has not been described in detail, as it is not deemed necessary to a clear understanding of the present invention. No claims to novelty are made to such parts; but it may be added that 43 is the drive-shaft, on which is provided any suitable clutching mechanism, and 44 is the longitudinally-extending rock-shaft, through which the clutch mechanism may be operated.

44′ (shown in dotted lines in Fig. 1) represents the hand-lever, by means of which the rock-shaft 44 and clutching mechanism are controlled.

The operation of the mechanism is as follows: In ordinary operation the position of the reciprocating bar 18 is as shown in Fig. 1, in which position the slot 19' of the head-piece 19 engages the arm 15' and rocks the bell-crank 15, thereby alternately throwing in and out of operation the feeding mechanism on each stroke of the feed-lever 7. When it is time to insert a division-block, which has already been placed in position in the frame 21, the operator presses the foot-lever 28 and causes the upwardly-extending portion 26' of the forked arm 26 to approach and lie against the bar 18, as shown by dotted lines in Fig. 5. Assuming that the foot-lever 28 is depressed when the feeder-arm and bar occupy the positions shown in Fig. 1, the feeding-chain 13 will be in operation and will deliver a normal charge into the hopper. On the descent of the feed-arm with the corresponding forward movement of the bar 18 the bell-crank 15 will be rocked forwardly and the cam-track 14 dropped, as shown by dotted lines in the same figure, thus rendering inoperative the feeding-chain 13. Immediately after this movement of the bell-crank has been accomplished the roller 27 will contact the upwardly-extending portion 26' of the forked arm 26. Further movement of the reciprocating bar will cause the swivel-block 25 to rock about its axis, the arm $25^4$ raising the sliding frame 24, with said bar resting thereupon in the manner heretofore described, to the position shown in Fig. 2. In this position the feed-arm 7 is at the end of its downward movement and the bar 18 at the end of its forward travel. It will be seen that the latch 30 has engaged the head 24' of the frame 24, in which position it will remain until the latch is released. The feed-arm 7 now ascends and the bar 18 moves rearwardly, riding on the roller $24^3$ and above the bell-crank 15, so that the latter remains stationary and permits the feeding-chain to continue inoperative. As soon as the rearward movement of the bar begins the upwardly-extending portion 26' is released and is swung outwardly by the spring 27' to the position shown in Fig. 5. The spring-held pawl, which at the end of the forward movement of the bar 18 occupies a position forward of the lever-arm 36, moves rearwardly. The bevel portion $33^2$ thereof contacting the arm 36 will be forced outwardly, as shown by the dotted lines in Fig. 4, thus sliding by the arm without affecting it. The feeder-arm 7 having reached its upper position and the bar its rearward position, the return movement of each will begin. As the rear end of the bar continues in its raised position the feeding mechanism will continue inoperative; but when the shoulder $33^3$ of the pawl 33 impinges the lower end of the lever-arm 36, as indicated by the full lines in Fig. 4, the rock-shaft 35' will be actuated, moving the arm 37 rearwardly and through the link 38 push the block-carrying frame from the position shown in Fig. 2 to that shown in Fig. 3. In the last-mentioned position the block 42 will be shoved from its support on the top of the press over the opening in the compression-chamber, thus permitting the block to drop therein. Simultaneous with this movement of the block-carrying frame the feeder-head 8 will have descended into the hopper and compression-chamber, so that when the block drops from the carrying-frame the feeder-head will be in position to prevent it from falling forward. By the time the plunger 4 advances sufficiently to engage the block the feeder-head will have been withdrawn to prevent interference. During the rearward movement of the upper end of the lever-arm 36 the short link 39, owing to the shortening of the distance between the points connected by the links 39 and 40, will drop to the position shown in Fig. 3. The arrangement is such that the latter part of the forward movement of the bar 18 will cause the pin 41 to contact the short link 39 and disengage the latch 30, thus permitting the sliding frame 24 to drop the head 19 of the bar 18 into reëngagement with the bell-crank 15. The return of the bar rearwardly will operate the bell-crank in the usual manner, and the operation continues until it is desired to insert another block.

What I claim as my invention, and desire to secure by Letters Patent, is—

1. In a baling-press, in combination, an oscillating feed-arm, a longitudinally-movable block-carrying frame, a feeding mechanism, single means in connection with said oscillating feed-arm for controlling the movement of the block-carrying frame and feeding mechanism, a device for automatically raising and lowering said means into alternate engagement therewith, and means for moving said device into an operative position.

2. In a baling-press, in combination, an oscillating feed-arm, a longitudinally-movable block-carrying frame, a feeding mechanism, a horizontally-disposed reciprocating bar in connection with said oscillating feed-arm for controlling the movement of the block-carrying frame and feeding mechanism, a device for automatically raising and lowering said reciprocating bar into alternate engagement with the members which it controls, and means for moving said device into an operative position.

3. In a baling-press, in combination, an oscillating feed-arm, a longitudinally-movable block-carrying frame, a feeding mechanism, a horizontally-disposed reciprocating bar in connection with said oscillating feed-arm for controlling the movement of the block-carrying frame and feeding mechanism, a device actuated by the forward movement of said reciprocating bar for automatically raising and lowering said reciprocating bar into alternate engagement with the members which it controls, and means for moving said device into an operative position.

4. In a baling-press, in combination, an oscillating feed-arm, a longitudinally-movable block-carrying frame, a feeding mechanism, a horizontally-disposed reciprocating bar in connection with said oscillating feed-arm for controlling the movement of the block-carrying frame and feeding mechanism, a bell-crank actuated by the forward movement of said reciprocating bar for automatically raising and engaging same with the block-carrying frame, a tripping device actuated in conjunction with the said frame for permitting the bar to drop into an engaging position with respect to the feeding mechanism, and means for swinging said bell-crank to an operative position.

5. In a baling-press, in combination, an oscillating feed-arm, a horizontally-disposed reciprocating bar arranged to operate in an upper and a lower position, a device for automatically moving the bar from one position to another, a longitudinally-movable block-carrying frame actuated by the said bar in the forward movement thereof, and a feeding mechanism, the movement of which is controlled by said reciprocating bar when in its lower position.

6. In a baling-press, in combination, an oscillating feed-arm, a longitudinally-movable block-carrying frame, a feeding mechanism, a horizontally-disposed reciprocating bar in connection with said oscillating feed-arm for controlling the movement of the block-carrying frame and feeding mechanism, a vertically-movable roller-carrying frame on which the rear end of said bar is supported, a bell-crank actuated by the forward movement of said reciprocating bar and arranged to lift the roller-carrying frame and bar, a retaining-latch for temporarily holding the said frame and bar in their raised position, and a tripping device actuated in conjunction with said block-carrying frame for releasing said retaining-latch.

7. In a baling-press, in combination, an oscillating feed-arm, a longitudinally movable block-carrying frame, a feeding mechanism, a horizontally-disposed reciprocating bar arranged to operate in upper and lower positions and control the movement of the block-carrying frame and feeding mechanism, a laterally-yielding bell-crank for automatically moving the bar from one position to another, and a laterally-yielding spring-held dog for actuating the said block-carrying frame, the said bell-crank and dog being actuated by the forward movement only of the said reciprocating bar.

8. In a baling-press, in combination, a plunger, a hopper, an oscillating feed-arm provided with a feeder-head, a longitudinally-movable block-carrying frame, and positive means for advancing the said frame to deposit the block and for causing the descent of the said feeder-head into the hopper whereby the block is held in an upright position in the hopper until engaged by the plunger.

JULIAN H. PITKIN.

Witnesses:
S. W. NICHOLLS,
A. B. HANSON.